United States Patent
Kang et al.

(10) Patent No.: US 7,282,986 B2
(45) Date of Patent: Oct. 16, 2007

(54) NEGATIVE VOLTAGE GENERATOR CIRCUIT

(75) Inventors: Sang-Hee Kang, Kyoungki-do (KR); Jun-Gi Choi, Kyoungki-do (KR); Yong-Kyu Kim, Kyoungki-do (KR)

(73) Assignee: Hynix Semiconductor, Ltd. (KR)

( * ) Notice: Subject to any disclaimer, the term of this patent is extended or adjusted under 35 U.S.C. 154(b) by 78 days.

(21) Appl. No.: 11/193,814

(22) Filed: Jul. 27, 2005

(65) Prior Publication Data

US 2006/0097773 A1    May 11, 2006

(30) Foreign Application Priority Data

Nov. 9, 2004    (KR)    ...................... 10-2004-0090994

(51) Int. Cl.
*G05F 1/10*    (2006.01)
(52) U.S. Cl. ...................... 327/536; 327/537; 327/534; 327/390; 327/589; 327/590; 307/110
(58) Field of Classification Search ................. 327/536
See application file for complete search history.

(56) References Cited

U.S. PATENT DOCUMENTS

| | | | | |
|---|---|---|---|---|
| 5,920,226 A | * | 7/1999 | Mimura ...................... | 327/537 |
| 5,945,869 A | * | 8/1999 | Koelling ..................... | 327/534 |
| 5,999,009 A | * | 12/1999 | Mitsui ......................... | 324/765 |
| 6,130,829 A | * | 10/2000 | Shin ............................. | 363/60 |
| 6,281,724 B1 | * | 8/2001 | Ellis ............................. | 327/143 |
| 6,507,237 B2 | * | 1/2003 | Hsu et al. .................... | 327/538 |
| 6,518,831 B1 | * | 2/2003 | Hur et al. .................... | 327/537 |
| 6,703,891 B2 | * | 3/2004 | Tanaka ........................ | 327/536 |
| 2002/0041531 A1 | * | 4/2002 | Tanaka et al. .............. | 365/205 |
| 2006/0097773 A1 | * | 5/2006 | Kang et al. ................. | 327/536 |

FOREIGN PATENT DOCUMENTS

| | | |
|---|---|---|
| JP | 2000-49299 | 2/2000 |
| KR | 1999-003681 | 1/1999 |
| KR | 2000-0013309 | 3/2000 |

* cited by examiner

*Primary Examiner*—Tuan T. Lam
*Assistant Examiner*—Hiep Nguyen
(74) *Attorney, Agent, or Firm*—Blakely Sokoloff Taylor & Zafman

(57) ABSTRACT

The present invention is related to a negative voltage generating circuit for reliably providing the semiconductor integrated circuit (IC) with a negative voltage. An electric charge pumping device generates a negative voltage by pumping an electric charge to a predetermined level supplied to one of a first node and a second node. A controlling device provides first and second pumping clock signal being clocked alternately every predetermined interval in response to a level of the negative voltage. A pumping controller controls an amount of electric charge supplied to the first node and the second node in response to the first and second pumping clock signals. Further, a reset controller resets the first node and the second node of the electric charge pumping means as the level of the negative voltage when the first and second pumping clock signals are inactivated.

20 Claims, 7 Drawing Sheets

NEGATIVE VOLTAGE GENERATOR CIRCUIT

FIELD OF INVENTION

The present invention relates to a semiconductor integrated circuit (IC); and, more particularly, to a negative voltage generating circuit for reliably providing the semiconductor integrated circuit (IC) with a negative voltage.

DESCRIPTION OF PRIOR ART

In a semiconductor integrated circuit (IC), a negative voltage is used. Therefore, an internal voltage generating circuit for providing the negative voltage reliably is included in the semiconductor IC.

FIG. 1 is a block diagram showing a conventional generating circuit outputting a negative voltage VBB.

As shown, the conventional generating circuit includes a sensor 10, an oscillator 20, a phase controller 30, and a charge pump 40.

The sensor 10 senses level of the negative voltage VBB for outputting an enable signal OSC_EN activated based on a sensing result. The oscillator 20 outputs clock signals OSC1 and OSC2 in response to the enable signal OSC_EN. The phase controller 30 receives the clock signals OSC1 and OSC2 to thereby output electric charge pumping clock signals P1 and P2, whose phases are opposite to each other, and electric charge pumping switch signal G1 and G2. Herein, the electric charge pumping switch signals G1 and G2 have opposite phases to the electric charge pumping clock signals P1 and P2, respectively.

Further, the charge pump 40 outputs the negative voltage VBB in response to the electric charge pumping clock signals P1 and P2 and the electric charge pumping switch signals G1 and G2.

FIG. 2 is a schematic circuit diagram showing the charge pump 40 shown in FIG. 1.

As shown, the charge pump 40 includes first to fourth capacitors PM1, PM2, PM3, and PM4 and first and second NMOS transistors NM1 and NM2. The first to fourth capacitors PM1, PM2, PM3, and PM4 provided with PMOS transistors receive the electric charge pumping clock signals P1 and P2 and the electric charge pumping switch signals G1 and G2. In detail, the first capacitor PM1 and the third capacitor PM3 receive the electric charge pumping clock signals P1 and P2 respectively; and the second capacitor PM2 and the fourth capacitor PM4 receive the electric charge pumping switch signals G1 and G2 respectively. Meanwhile, the first and second NMOS transistors NM1 and NM2, whose gates are cross-coupled to each other, provide the negative voltage VBB through their first terminals; and each second terminal of the first and second NMOS transistors NM1 and NM2 is coupled to nodes P1BOOT and P2BOOT, respectively.

Further, the charge pump 40 includes first and second PMOS transistors PM5 and PM6, whose gates are coupled to second terminals of the second capacitor PM2 and the fourth capacitor PM4 respectively, and third to eighth PMOS transistors PM7, PM8, PM9, PM10, PM11, and PM12 connected between a third and fourth nodes G1BOOT and G2BOOT and a ground voltage VSS. The first and second PMOS transistors PM5 and PM6 are coupled between the second terminals of the first and second NMOS transistors NM1 and NM2 and the ground voltage VSS. The other six PMOS transistors PM7, PM8, PM9, PM10, PM11, and PM12 are for clamping voltage of the third and fourth nodes G1BOOT and G2BOOT; i.e., the third to eighth PMOS transistors PM7, PM8, PM9, PM10, PM11, and PM12 make the voltage of the third and fourth nodes G1BOOT and G2BOOT hold a value in a predetermined range.

FIG. 3 is a waveform showing an operation of the generating circuit outputting a negative voltage VBB shown in FIG. 1.

Hereinafter, referring to FIGS. 1 to 3, the operation of the generating circuit for outputting the negative voltage VBB is explained.

The sensor 10 senses a level of the negative voltage VBB to thereby output the enable signal OSC_EN in the case when the level becomes lower than a minimum value of the predetermined range.

Then, after receiving the activated enable signal OSC_EN, the oscillator 20 starts an oscillating operation for outputting the oscillated clock signals OSC1 and OSC2.

The phase controller 30 receives the clock signals OSC1 and OSC2 to output electric charge pumping clock signals P1 and P2, whose phases are opposite to each other, and electric charge pumping switch signal G1 and G2. Herein, the electric charge pumping switch signals G1 and G2 have opposite phase to the electric charge pumping clock signals P1 and P2, respectively.

The charge pump 40 outputs the negative voltage VBB by pumping the electric charge and transmitting the electric charge from an its output voltage terminal to the ground voltage terminal in response to the electric charge pumping clock signals P1 and P2 and the electric charge pumping switch signals G1 and G2. If the enable signal OSC_EN outputted from the sensor 10 becomes inactive, the charge pump 40 stops pumping operation and do not transmit the electric charge to the ground voltage terminal.

Looking the operation of the charge pump 40 more closely, the electric charge is pumped and transferred from the output terminal of the charge pump 40 to the node P1BOOT in response to the electric charge pumping clock signal P1; and, then, moved from the node P1BOOT to the ground voltage terminal in response to the electric charge pumping switch signal G1.

Meanwhile, the electric charge is pumped and transferred from the output terminal of the charge pump 40 to the node P2BOOT in response to the electric charge pumping clock signal P2; and, then, move from the node P2BOOT to the ground voltage terminal in response to the electric charge pumping switch signal G2.

By pumping the electric charge through abovementioned two methods, the negative voltage VBB is provided to the output terminal of the charge pump 40.

However, if a level of operation voltage is getting smaller and an absolute threshold voltage value of the PMOS transistors PM5 and PM6 become larger, level of the third and fourth nodes G1BOOT and G2BOOT rise as shown in FIG. 3. Therefore, a capability of the PMOS transistors PM5 and PM6 for transmitting the electric charge is decreased; and, then, an electric charge transmission from the nodes P1BOOT and P2BOOT to the ground voltage VSS is not operated smoothly.

Because of abovementioned reason, a driving force of a charge pump becomes weak. Therefore, it is unavoidable that the size of the pump should be larger in order to solve aforementioned problem.

SUMMARY OF INVENTION

It is, therefore, an object of the present invention to provide a negative voltage generating circuit for reliably providing the semiconductor integrated circuit (IC) with a negative voltage.

In accordance with an aspect of the present invention, there is provided a negative voltage generating circuit including: an electric charge pumping device for providing an output terminal with a negative voltage by pumping an electric charge from the output terminal to one of a first node and a second node; a first pumping controlling device for controlling the electric charge to be pumped from the output terminal to the first node in response to a first pumping clock signal; a second pumping controlling device for controlling the electric charge pumped from the output terminal to the second node in response to a second pumping clock signal; a controlling device for providing the first pumping clock signal and the second pumping clock signal, wherein the first pumping clock signal and the second pumping clock signal are clocked alternately every predetermined interval in response to a level of the negative voltage provided to the output terminal; and a first reset controlling device for resetting the first node and the second node of the electric charge pumping device as the level of the negative voltage when the first pumping clock signal and the second pumping clock signal are inactivated.

In accordance with an another of the present invention, there is provided a negative voltage generating circuit of a semiconductor device for generating a negative voltage of a level lower than a ground voltage through an output terminal including: a controlling device for sensing a level of the negative voltage provided through the output terminal and outputting first and second pumping clock signals and first and second pumping switch signals, wherein the first pumping clock signal and the second pumping clock signal have opposite phase each other and the first and second pumping switch signals have opposite phase with the first and second pumping clock signals, respectively; first and second NMOS transistors whose first terminals are connected to the output terminal together and second terminals are connected to first and second nodes, respectively, gates are cross-coupled each other; a first capacitor for receiving the first pumping clock signal through its second terminal, wherein a first terminal of the first capacitor is connected to the first node; a second capacitor for receiving the second pumping clock signal through its second terminal, wherein a first terminal of the second capacitor is connected to the second node; a first switching PMOS transistor connected between the first node and the ground voltage; a second switching PMOS transistor connected between the second node and the ground voltage; a third capacitor for receiving the first pumping switch signal through its second terminal, wherein a first terminal of the third capacitor is connected to a gate of the first switching PMOS transistor; a fourth capacitor for receiving the second pumping switch signal through its second terminal, wherein a first terminal of the fourth capacitor is connected to a gate of the second switching PMOS transistor; and a reset controlling means for resetting terminals of the first, second, third, and fourth capacitors when the first and second pumping clock signals and the first and second pumping switch signals are inactivated, wherein the reset controlling means resets the first terminals of the first and second capacitors to the ground voltage level and the second terminals of the first and second capacitors to the negative voltage level, and further, the reset controlling means resets the first terminals of the third and fourth capacitors to a power supply voltage level and the second terminals of the third and fourth capacitors to the ground voltage level.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

Hereinafter, a negative voltage generator circuit for use in a semiconductor device in accordance with the present invention will be described in detail referring to the accompanying drawings.

Figure 1:
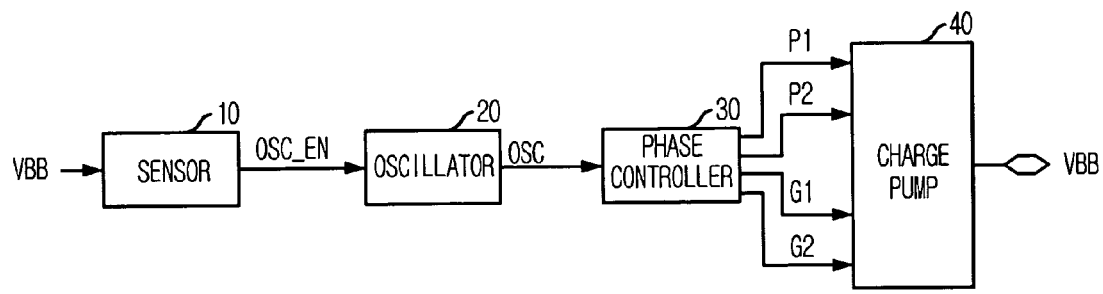
FIG. 1 is a block diagram showing a conventional generating circuit for outputting a negative voltage.
Figure 2:
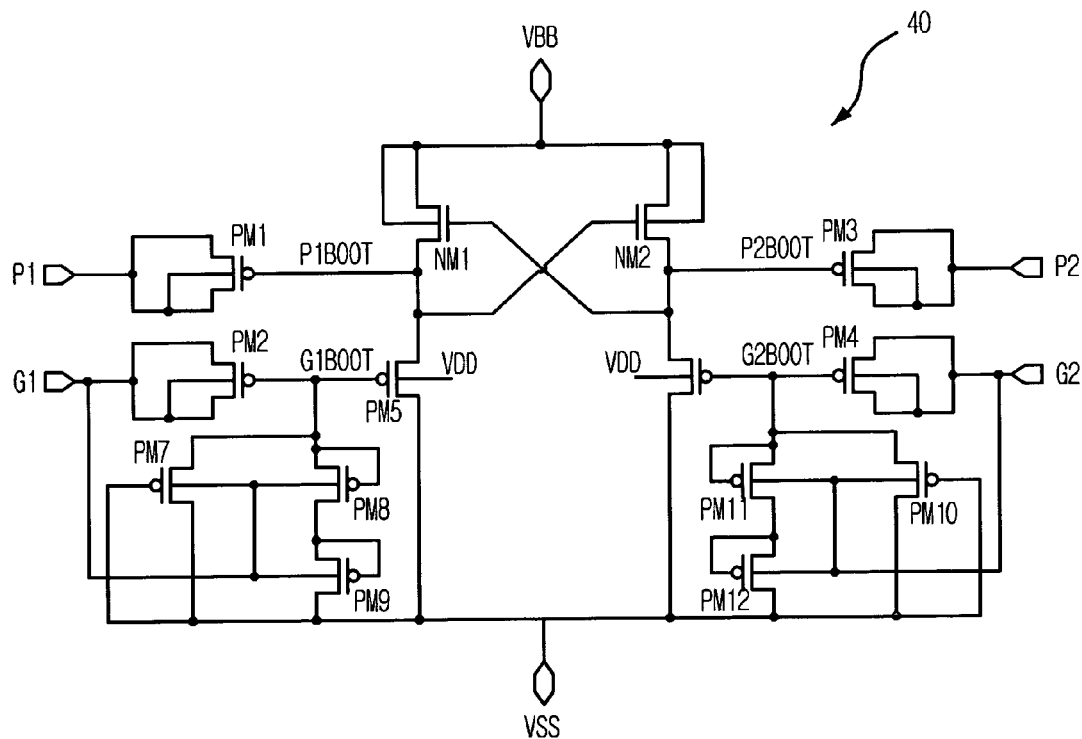
FIG. 2 is a schematic circuit diagram showing the charge pump shown in FIG. 1.
Figure 3:
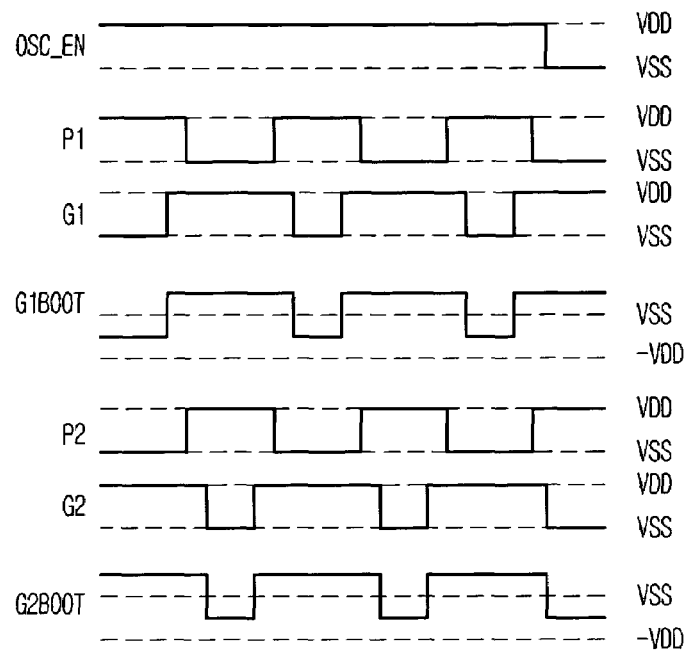
FIG. 3 is a waveform demonstrating an operation of the generating circuit outputting a negative voltage shown in FIG. 1.
Figure 4:
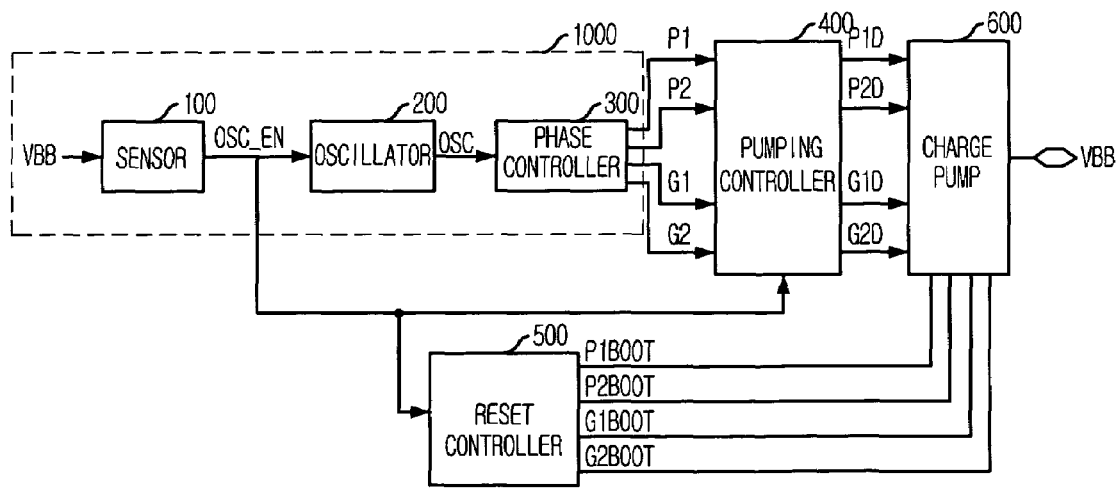
FIG. 4 is a block diagram showing a generating circuit for outputting a negative voltage in accordance with a preferred embodiment of the present invention.

FIG. 4 is a block diagram showing a generating circuit outputting a negative voltage VBB in accordance with a preferred embodiment of the present invention.

As shown, the generating circuit for outputting the negative voltage VBB in accordance with the preferred embodiment is provided with a controller 1000 and a charge pump 600.

The controller 1000 includes a sensor 100, an oscillator 200, and a phase controller 300. The sensor 100 is for sensing level of the negative voltage VBB and outputting an enable signal OSC_EN. The oscillator 200 outputs a clock signal OSC by performing an oscillation operation in response to the enable signal OSC_EN. The phase controller 300 receives the clock signal OSC and outputs a first electric charge pumping clock signal P1 and a second electric charge pumping clock signal P2, whose phases are opposite to each other, and a first electric charge pumping switch signal G1 and a second electric charge pumping switch signal G2. Herein, the electric charge pumping switch signals G1 and G2 have opposite phases to the electric charge pumping clock signals P1 and P2, respectively. The charge pump 600 is for outputting the negative voltage VBB to its output terminal by pumping electric charge.

Further, the generating circuit outputting the negative voltage VBB in accordance with the preferred embodiment includes a reset controller 500 and a pumping controller 400. The pumping controller 400 outputs electric charge pumping clock signal P1D and P2D and electric charge pumping switch signals G1D and G2D buffered from the electric charge pumping clock signals P1 and P2 and the electric charge pumping switch signals G1 and G2 transmitted from the phase controller 300 in response to the enable signal OSC_EN.

In the case that the enable signal OSC_EN is inactivated, the pumping controller 400 makes the electric charge pumping clock signals P1D and P2D be a ground voltage level VSS and the electric charge pumping switch signals G1D and G2D be a positive supply voltage level. Also, in the case that the enable signal OSC_EN is inactivated, the reset controller 500 holds a voltage of nodes P1BOOT and P2BOOT of the charge pump 600 as the negative voltage VBB level and those of the third and fourth nodes G1BOOT and G2BOOT as the ground voltage VSS level.

Figure 5A:
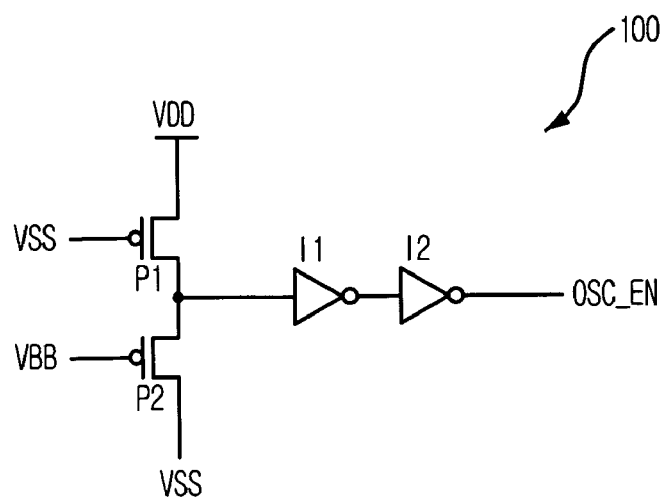
FIG. 5A is a schematic circuit diagram depicting a sensor shown in FIG. 4.

FIG. 5A is a schematic circuit diagram describing the sensor 100 shown in FIG. 4.

As shown, the sensor 100 is constituted with first and second MOS transistors P1 and P2 and a first buffer provided with two inverters I1 and I2. The first MOS transistor P1 receives the ground voltage VSS through its gate and its first terminal is connected to the power supply voltage VDD. The second MOS transistor P2 receives the negative voltage through its gate and its first terminal is connected to the ground voltage VSS. An input terminal of the first buffer is connected to common second terminals of the first and second MOS transistors P1 and P2; and the first buffer outputs the enable signal OSC_EN.

Figure 5B:
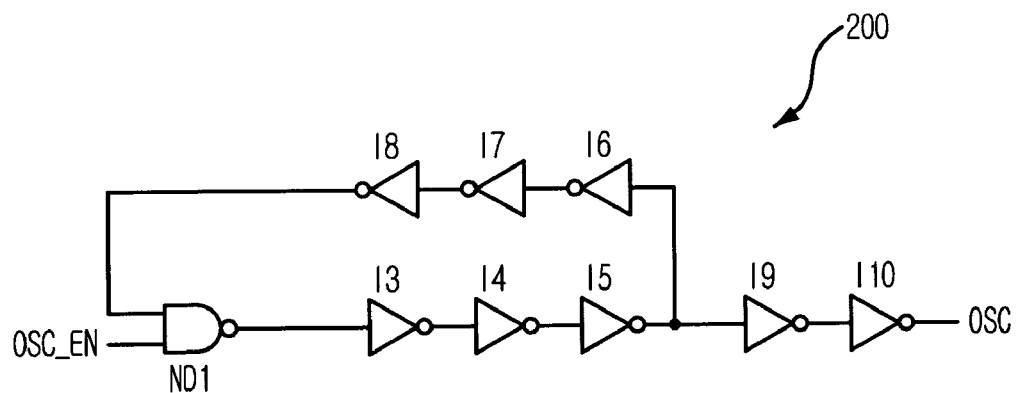
FIG. 5B is a schematic circuit diagram describing a oscillator shown in FIG. 4.

FIG. 5B is a schematic circuit diagram describing the oscillator 200 shown in FIG. 4.

As shown, the oscillator 200 is constituted with a first NAND gate ND1 receiving the enable signal OSC_EN and even numbers of third to fourth inverters I3, I4, I5, I6, I7, and I8 serially connected to one another and, further, a second buffer provided with ninth and tenth inverters I9 and I10. Herein, the third inverter I3 receives a signal outputted from the first NAND gate ND1; and an output signal from the eighth inverter I8 is inputted to a second terminal of the first NAND gate ND1. The second buffer provided with the ninth and tenth inverters I9 and I10 buffers an output signal from the fifth inverter I5 to thereby output the clock signal OSC.

Figure 5C:
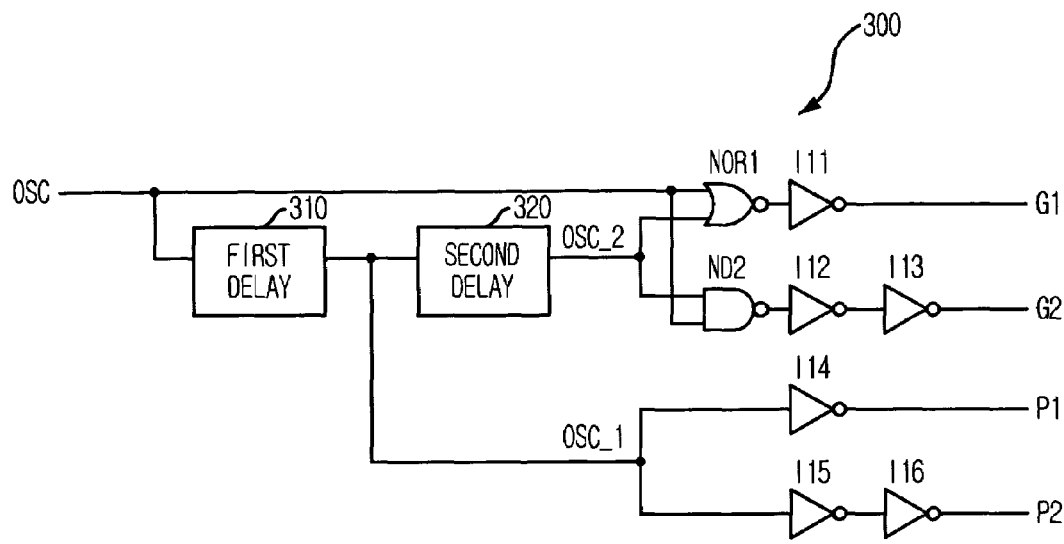
FIG. 5C is a schematic circuit diagram showing a phase controller shown in FIG. 4.

FIG. 5C is a schematic circuit diagram showing the phase controller 300 shown in FIG. 4.

As shown, the phase controller 300 has a first delay 310 for delaying the clock signal OSC outputted from the oscillator 200 for a first predetermined time and a second delay 320 for delaying the delayed clock signal OSC_1 from the first delay for a second predetermined time.

The phase controller 300 further includes a phase OR gate, a phase NAND gate, a phase inverter I14, and a third buffer. The phase OR gate is provided with a first NOR gate NOR1 and an inverter I11 to output the first electric charge pumping switch G1. The phase NAND gate is provided with a second NAND gate ND2 and two inverters I12 and I13 to output the second electric charge pumping switch G2. The phase NAND gate receives the clock signal OSC and the delayed clock signal OSC_2 outputted from the second delay 320. The phase inverter I14 inverts the delayed clock signal OSC_1 from the first delay 310 to output the first electric charge pumping clock signal P1. The third buffer, provided with two inverters I15 and I16, buffers the delayed clock signal OSC_1 outputted from the first delay 310 to output the second electric charge pumping clock signal P2.

Figure 5D:
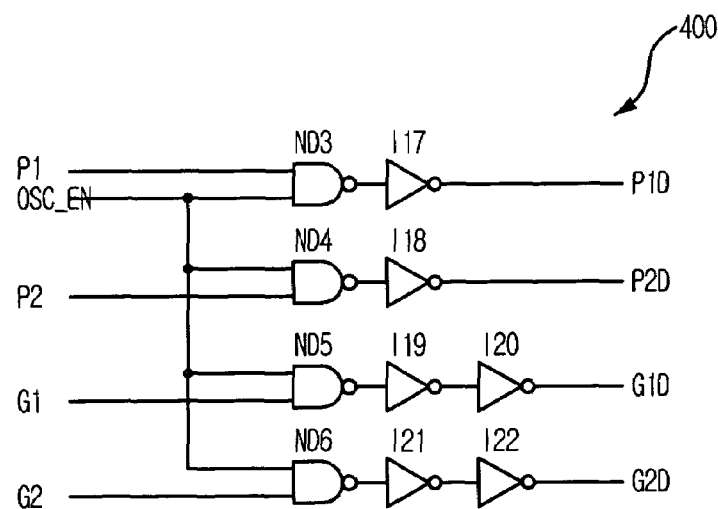
FIG. 5D is a schematic circuit diagram depicting a pumping controller shown in FIG. 4.

FIG. 5D is a schematic circuit diagram depicting the pumping controller 400 shown in FIG. 4.

As shown, the pumping controller 400 includes a first reset AND gate provided with a third NAND gate ND3 and an inverter I17, a second reset AND gate provided with a fourth NAND gate ND4 and an inverter I18, a first reset NAND gate provided with a fifth NAND gate ND5 and two inverters I19 and I20, and a second reset NAND gate provided with a sixth NAND gate ND6 and two inverters I21 and I22.

The first reset AND gate receives the output signal P1 from the phase inverter I14 of the phase controller 300 and the enable signal OSC_EN outputted from the sensor 100 to output the first electric charge pumping clock signal P1D. The second reset AND gate, provided with the fourth NAND gate ND4 and the inverter I18, receives the output signal P2 from the third buffer and the enable signal OSC_EN outputted from the sensor 100 to thereby output the second electric charge pumping clock signal P2D. The first reset NAND gate receives the output signal G1 from the phase OR gate and the enable signal OSC_EN outputted from the sensor 100 to output the first electric charge pumping switch signal G2D. The second reset NAND gate, provided with the sixth NAND gate ND6 and the two inverters I21 and I22, receives the output signal G2 from the phase NAND gate and the enable signal OSC_EN outputted from the sensor 100 to output the second electric charge pumping switch signal G2D.

Figure 5E:
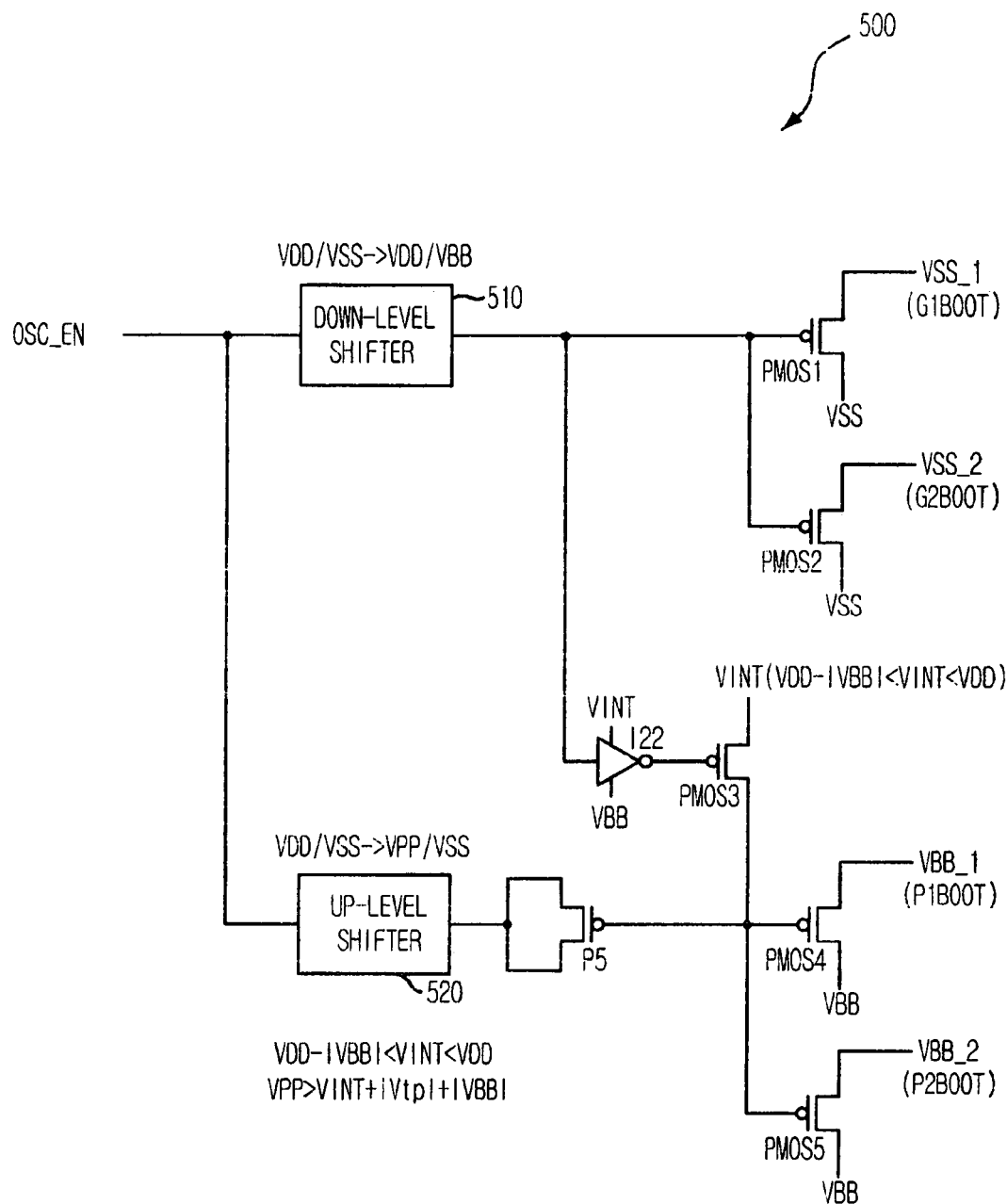
FIG. 5E is a schematic circuit diagram describing a reset controller shown in FIG. 4.

FIG. 5E is a schematic circuit diagram describing the reset controller 500 shown in FIG. 4.

As shown, the reset controller 500 is constituted with a down-level shifter 510, an up-level shifter 520, first to fifth reset MOS transistors PMOS1 to PMOS5, an inverter I22, and a reset capacitor P5.

The down-level shifter 510 shifts a level of the enable signal OSC_EN, inputted as a level of the power supply voltage VDD and the ground voltage VSS, to a level of the power supply voltage VDD and the negative voltage VBB. Meanwhile, the up-level shifter 520 shifts a level of the enable signal OSC_EN, inputted as a level of the power supply voltage VDD and the ground voltage VSS, to a level of an upper voltage VPP higher than the power supply voltage VDD and the ground voltage VSS. The first and second reset MOS transistors PMOS1 and PMOS2 output the ground voltages VSS_1 and VSS_2, transmitted through their first terminals, to the third and fourth nodes G1BOOT and G2BOOT of the charge pump 600 connected to their second terminals, respectively, in response to the enable signal OSC_EN shifted by the down-level shifter 510. The inverter I22 inverts and outputs the enable signal OSC_EN shifted by the down-level shifter 510. The third reset MOS transistor PMOS3 is for transmitting an input voltage VINT (VDD−|VBB|<VINT<VDD), inputted through its first terminal, to its second terminal in response to an output signal from the inverter I22. The reset capacitor P5 is for receiving the enable signal shifted by the up-level shifter 520 through its first terminal. Finally, the fourth and fifth reset MOS transistors PMOS4 and PMOS5, whose gates are connected to the second terminal of the capacitor P5 and the second terminal of the third reset MOS transistor PMOS3, output the negative voltages VBB_1 and VBB_2, transmitted through their first terminal, to the first and second nodes P1BOOT and P2BOOT of the charge pump 600 connected to their second terminals, respectively.

Figure 5F:
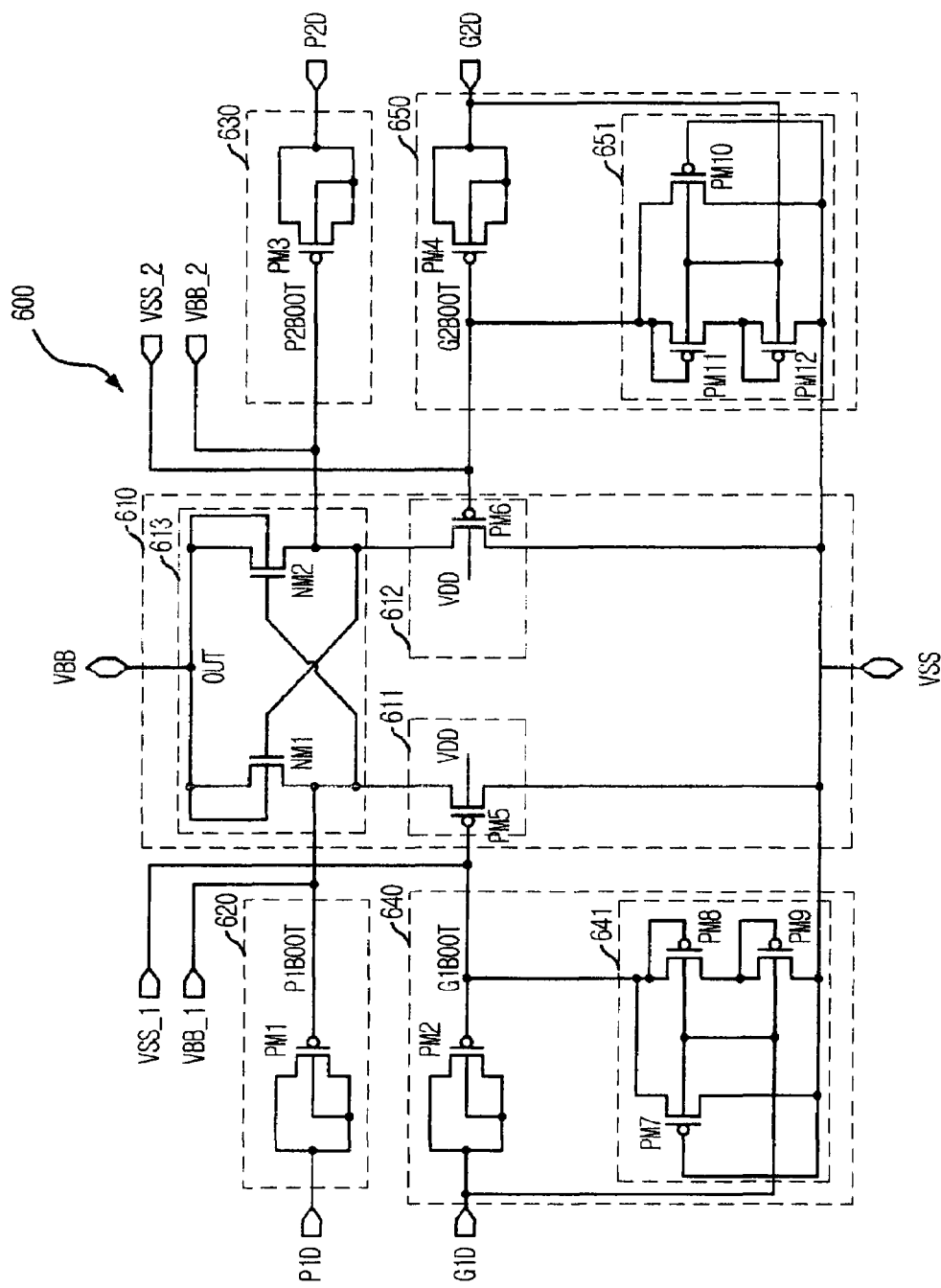
FIG. 5F is a schematic circuit diagram describing a charge pump shown in FIG. 4.

FIG. 5F is a schematic circuit diagram depicting the charge pump 600 shown in FIG. 4.

As shown, the charge pump 600 is provided with an electric charge pumping block 610, a first electric charge pumping controller 620, and a second electric charge pumping controller 630. The electric charge pumping block 610 supplies the negative voltage VBB to an output terminal OUT by pumping and transmitting an electric charge from the output terminal OUT to the first node P1BOOT or the second node P2BOOT. The first electric charge pumping controller 620 is for pumping and transmitting the electric charge from the output terminal OUT to the first node P1BOOT in response to the first electric charge pumping clock signal P1D, and the second electric charge pumping controller 630 is for pumping the electric charge from the output terminal OUT to the second node P2BOOT in response to the second electric charge pumping clock signal P2D.

Further, the electric charge pumping block 610 includes an electric charge transmitting block 613, a first switching block 611, and a second switching block 612. The electric charge transmitting block 613 transmits the electric charge from the output terminal OUT to the first node P1BOOT or the second node P2BOOT. The first switching block 611 is for switching the first node P1BOOT and the ground voltage VSS, and the second switching block 612 is for switching the second node P2BOOT and the ground voltage VSS.

Still further, the electric charge transmitting block 613 is provided with first and second NMOS transistors NM1 and NM2 for transmitting the electric charge. First terminals of the first and the second NMOS transistor NM1 and NM2 are coupled together to the output terminal OUT, and the second terminals of the first and second NMOS transistors NM1 and NM2 are coupled to the first node P1BOOT and the second node P2BOOT, respectively. Also, their gates are cross-coupled with the second terminal of each others.

Meanwhile, the first switching block 611 has a first switch PMOS transistor PM5 being applied with a signal outputted from a first switching controller 640 via its gate and being connected to the first node P1BOOT and the ground voltage VSS.

The second switching block 612 has a second switch PMOS transistor PM6 which receives a signal outputted from a second switching controller 650 through its gate and is connected to the second node P2BOOT and the ground voltage VSS.

That is, during a period that the first electric charge pumping clock signal P1D and the second electric charge pumping clock signal P2D are inactivated, the reset controller 500 makes gates of the first and second switch PMOS transistors PM5 and PM6 be reset as the ground voltage VSS level.

The first electric charge pumping controller 620 the second electric charge pumping controller 630 include a first capacitor PM1 and a third capacitor PM3, respectively. The first capacitor PM1 receives the first electric charge pumping clock signal P1D through its first terminal and its second terminal is connected to the first node P1BOOT. The second capacitor PM2 receives the second electric charge pumping clock signal P2D through its first terminal and its second terminal is connected to the second node P2BOOT.

Further, the charge pump 600 has the first switch controller 640 and the second switch controller 650.

The first switch controller 640 is provided with a second capacitor PM2 and a first clamping circuit 641. Herein, the second capacitor PM2 receives the first electric charge pumping switch signal G1D through its first terminal and its second terminal is connected to the third node G1BOOT. Meanwhile, the first clamping circuit 641 is for making the voltage of the third node G1BOOT connected to the second terminal of the second capacitor PM2 stay in a predetermined voltage range.

The first clamping signal is provided with three PMOS transistors PM7, PM8, and PM9. The PMOS transistor PM7, whose gate is connected to the ground voltage VSS, is connected between the third node G1BOOT and the ground voltage VSS. A first terminal of the PMOS transistor PM9 is connected to the ground voltage VSS and its gate is connected to its second terminal. The PMOS transistor PM8 is connected to the second terminal of the PMOS transistor PM9 through its first terminal and connected to the third node G1BOOT through its second terminal and gate.

The second switch controller 650 is provided with a fourth capacitor PM4 and a second clamping circuit 651. The fourth capacitor PM4 receives the second electric charge pumping switch signal G2D through its first terminal. Also, a second terminal of the fourth capacitor PM4 is connected to the fourth node G2BOOT. The second clamping circuit 651 makes a voltage of the node G2BOOT stay in a predetermined voltage range.

The second clamping circuit 651 is provided with three PMOS transistors PM10, PM11, and PM12. The PMOS transistor PM10, whose gate is connected to the ground voltage VSS, is connected between the fourth node G2BOOT and the ground voltage VSS. A first terminal of the PMOS transistor PM12 is connected to the ground voltage VSS, and a gate and a second terminal of the PMOS transistor PM12 is connected to each other. Also, a first terminal of the first PMOS transistor PM11 is connected to the second terminal of the PMOS transistor PM12, and both a gate and a second terminal of the PMOS transistor PM11 are connected to the fourth node G2BOOT together.

Further, the negative voltage generator circuit in accordance with the preferred embodiment of the present invention further includes the pumping controller 400 resetting input terminals of the first electric charge pumping controller 620 and the second electric charge pumping controller 630, which receives the electric charge pumping clock signals P1D and P2D respectively, and input terminals of the first switch controller 640 and the second switch controller 650, which receives the electric charge pumping switch signals G1D and G2D respectively, while the electric charge pumping clock signals P1D and P2D are inactivated.

Figure 6:
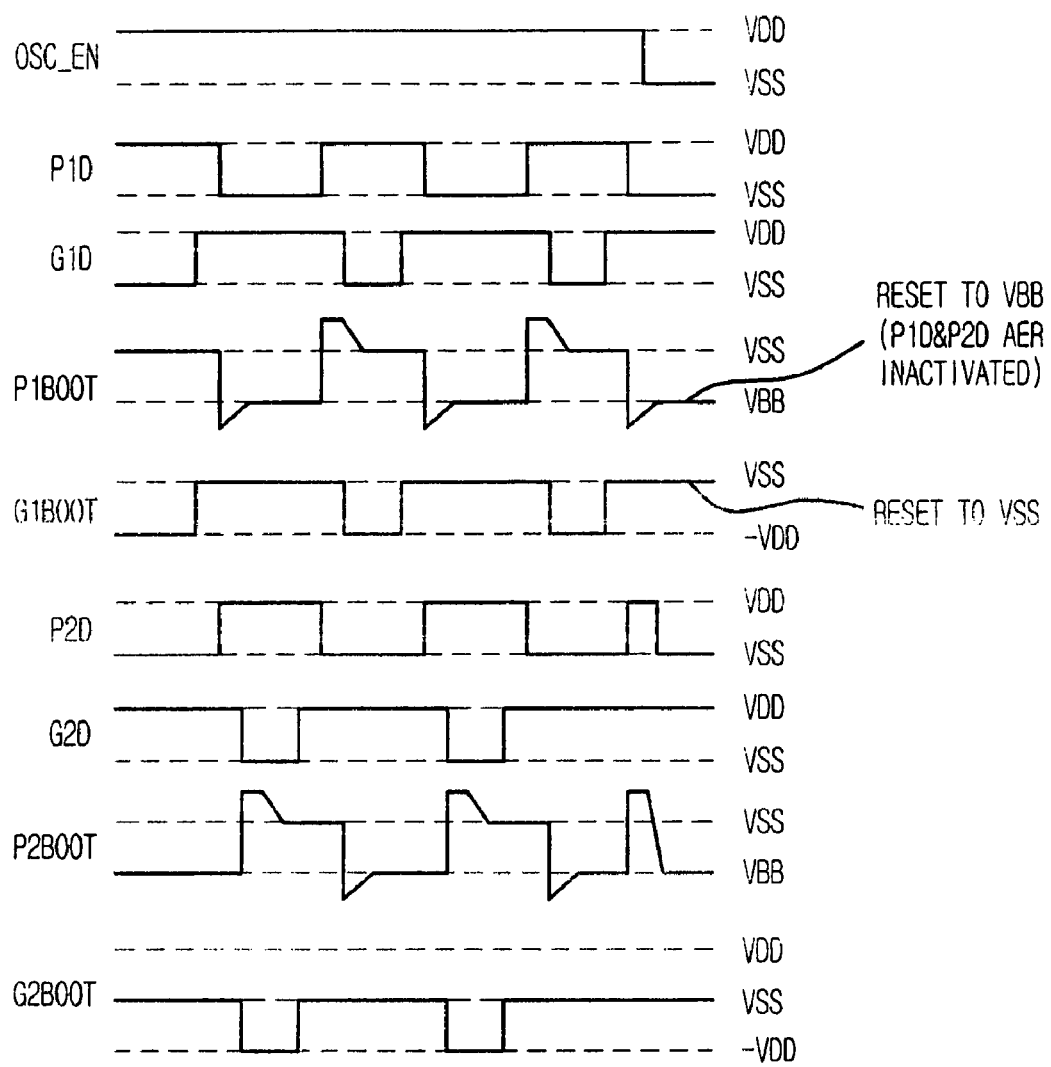
FIG. 6 is a waveform demonstrating an operation of the generating circuit shown in FIG. 4.

FIG. 6 is a timing diagram showing the operation of the generating circuit outputting a negative voltage shown in FIG. 4.

Hereinafter, referring to FIGS. 4 to 6, the operation of the generating circuit outputting a negative voltage is explained.

The sensor 100 senses the level of the negative voltage VBB, in the case of the level of the negative voltage VBB is lower than a minimum value of a predetermined range, activates the enable signal OSC_EN and outputs it.

Then, the oscillator 200 starts the oscillating operation and outputs the oscillated clock signal OSC after it receives the activated enable signal OSC_EN.

After the phase controller 300 receives the clock signal OSC, the phase controller 300 outputs the electric charge pumping clock signals P1 and P2, which have opposite phase each other, and the electric charge pumping switch signals G1 and G2 whose phases are opposite with the electric charge pumping clock signals P1 and P2, respectively.

While the enable signal OSC_EN is activated and inputted to the pumping controller 400, the pumping controller 400 outputs the electric charge pumping clock signal P1D and P2D and the electric charge pumping switch signals G1D and G2D by buffering the electric charge pumping clock signals P1 and P2 and the electric charge pumping switch signals G1 and G2. On the other hand, while the inactivated enable signal OSC_EN is inputted to the pumping controller 400, the pumping controller 400 outputs the electric charge pumping clock signals P1D and P2D as the ground voltage VSS level and the electric charge pumping switch signals G1D and G2D as the power supply voltage VDD level.

The charge pump 600 receives the electric charge pumping clock signals P1D and P2D and the electric charge pumping switch signals G1D and G2D and outputs the negative voltage VBB by pumping the electric charge from the output terminal to the ground voltage VSS providing terminal. When the enable signal OSC_EN outputted from the sensor 100 is inactivated, the charge pump 600 stops pumping the electric charge from its output terminal to the ground voltage VSS.

Looking the operation of the charge pump 600 more closely, the electric charge is pumped from the output terminal of the charge pump 600 to the node P1BOOT in response to the electric charge pumping clock signal P1D and, then, moved from the first node P1BOOT to the ground voltage VSS terminal in response to the electric charge pumping switch signal G1D.

Meanwhile, the electric charge is pumped from the output terminal of the charge pump 600 to the second node P2BOOT in response to the electric charge pumping clock signal P2D and, then, moves from the node P2BOOT to the ground voltage VSS terminal in response to the electric charge pumping switch signal G2D.

By pumping the electric charge through abovementioned two methods, the negative voltage VBB is provided to the output terminal of the charge pump 600.

The reset controller 500 does not operate while the enable signal OSC_EN is activated. However, while the enable signal OSC_EN is inactivated, the reset controller 500 makes the voltage of the first and second nodes P1BOOT and P2BOOT be reset as the negative voltage VBB level and the voltage of the third and fourth nodes G1BOOT and G2BOOT reset as the ground voltage VSS level.

In accordance with the conventional art, when the charge pump does not operate, the generating circuit keeps the voltage of the third and fourth nodes G1BOOT and G2BOOT as floating state. Therefore, the voltage levels of the third and fourth nodes G1BOOT and G2BOOT get higher and higher; and then, the operation of the charge pump get worse.

On the other hand, the generating circuit in accordance with the preferred embodiment of the present invention makes the voltage levels of the third and fourth nodes G1BOOT and G2BOOT be reset as the ground voltage VSS level while the charge pump 600 does not operate. Accordingly, the voltage levels of the third and fourth nodes G1BOOT and G2BOOT do not rise excessively.

In other words, while the charge pump 600 does not perform the operation for providing the negative voltage VBB, the both terminals of the first to fourth capacitors PM1 to PM4 for pumping operation of the charge pump 600 are provided with optimum voltage level in order to make the charge pump 600 operate a following electric charge pumping operation optimally.

Further, the less voltage level is provided to the gates of the first and second switch PMOS transistors PM5 and PM6 performing a switching operation, the more efficiently the charge pump 600 performs the electric charge pumping operation.

Therefore, the present embodiment reset the voltage level provided at the gates of the first and second switch PMOS transistors PM5 and PM6 to ground voltage VSS level.

Looking the operation of the reset controller 500 more closely, the down-level shifter 510 outputs a signal having the power supply voltage VDD level to the first and second MOS transistors PMOS1 and PMOS2 while the enable signal OSC_EN is activated as high level.

Meanwhile, the up-level shifter 520 converts the voltage level of the enable signal OSC_EN having the power supply voltage VDD level to the upper voltage VPP while the enable signal OSC_EN is activated as high level. Therefore, the fourth and fifth MOS transistors PMOS4 and PMOS5 are turned off.

When the enable signal OSC_EN is inactivated as low level and inputted to the down-level shifter 510, the down-level shifter 510 converts the level of the enable signal OSC_EN, inputted as a level of the power supply voltage VDD and the ground voltage VSS, into a level of the power supply voltage VDD and the negative voltage VBB.

Accordingly, the first and second MOS transistors PMOS1 and PMOS2 are turned on and provide the ground voltages VSS_1 and VSS_2, inputted through their first terminals, to the third and fourth nodes G1BOOT and G2BOOT connected to their second terminals.

Meanwhile, when the enable signal OSC_EN is inactivated and inputted to the up-level shifter 520, the up-level shifter 520 converts the level of the enable signal OSC_EN of the upper voltage VPP and the ground voltage VSS to the level of the power supply voltage VDD and the ground voltage VSS.

Then, the fourth and fifth MOS transistors PMOS4 and PMOS5 are turned on for providing the negative voltages VBB_1 and VBB_2, inputted from their first terminals, to the first and second node P1BOOT and P2BOOT connected to their second terminals, respectively.

The inverter 122 and the third MOS transistor PMOS3 of the reset controller 500 is provided for reliably turning off the fourth and fifth MOS transistors PMOS4 and PMOS5 during a period that the enable signal OSC_EN is activated. The third MOS transistor PMOS3 is turned on after it receives a signal with the power supply voltage VDD level outputted from the down-level shifter 510. Consequently, the voltage VINT with constant level is applied to the gates of the fourth and fifth MOS transistors PMOS4 and PMOS5. Then, the fourth and fifth MOS transistors PMOS4 and PMOS5 are turned off.

The generating circuit outputting the negative voltage VBB in accordance with the present invention is capable to perform the electric charge pumping operation efficiently by resetting the first to fourth nodes P1BOOT, P2BOOT, G1BOOT, and G2BOOT when the charge pump 600 stops performing the electric charge pumping operation in order to providing the negative voltage VBB. Therefore, it is possible to reliably provide the negative voltage VBB to the generating circuit in accordance with the present invention.

Further, the generating circuit provides same amount of the negative voltage VBB with less numbers of pumping operation compared to the conventional generating circuit because the generating circuit provides the negative voltage VBB reliably. Therefore, the present invention makes it possible to minimize a size of a generating circuit.

The present application contains subject matter related to Korean patent application No. 2004-90994, filed in the Korean Patent Office on Nov. 9, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A negative voltage generating circuit for use in a semiconductor device, comprising:
   an electric charge pumping means for generating a negative voltage by pumping an electric charge supplied to one of a first node and a second node;
   a controlling unit for providing a first pumping clock signal and a second pumping clock signal;
   a pumping controlling means for controlling an amount of electric charge supplied to the first node and the second node in response to the first and second pumping clock signals; and
   a reset controlling means for resetting the first node and the second node of the electric charge pumping means as the level of the negative voltage when the first pumping clock signal and the second pumping clock signal are inactivated.

2. The negative voltage generator circuit as recited in claim 1, wherein the first pumping clock signal and the second pumping clock signal are clocked alternately every predetermined interval in response to a level of the negative voltage.

3. The negative voltage generating circuit as recited in claim 2, wherein the pumping controlling means includes:
   a first pumping controlling means for controlling the electric charge pumped from the output terminal to the first node in response to a first pumping clock signal; and
   a second pumping controlling means for controlling the electric charge pumped from the output terminal to the second node in response to a second pumping clock signal.

4. The negative voltage generating circuit as recited in claim 3, wherein the electric charge pumping means includes:
   an electric charge transmitting means for transmitting the electric charge from the output terminal to one of the first node and the second node;
   a first switching means for switching the first node and a ground voltage; and
   a second switching means for switching the second node and the ground voltage.

5. The negative voltage generating circuit as recited in claim 4, further includes:
   a first pumping switch controlling means for receiving a first pumping switch signal and switching the first switching means, wherein the first pumping switch signal is outputted from the controlling unitand has an opposite phase with the first pumping clock signal; and
   a second pumping switch controlling means for receiving a second pumping switch signal and switching the second switching means, wherein the second pumping switch signal is outputted from the controlling unitand has an opposite phase with the second pumping clock signal.

6. The negative voltage generating circuit as recited in claim 5, wherein the first switching means is a first PMOS transistor connected to the first node and the ground voltage and a gate of the first switching means receives a signal outputted from the first pumping switch controlling means.

7. The negative voltage generating circuit as recited in claim 6, wherein the second switching means is a second PMOS transistor connected to the second node and the ground voltage and a gate of the second switching means receives a signal outputted from the second pumping switch controlling means.

8. The negative voltage generating circuit as recited in claim 7, wherein the reset controlling means resets gates of the first switching means and the second switching means to the ground voltage level when the first pumping clock signal and the second pumping clock signal are inactivated.

9. The negative voltage generating circuit as recited in claim 8, wherein the controlling unit includes:
   a sensing means for sensing the level of the negative voltage provided via the output terminal and outputting an enable signal in response to the sensed level of the negative voltage;
   an oscillating means for oscillating a clock signal in response to the enable signal;
   a phase controlling means for outputting a first pumping signal and a second pumping signal, wherein the first and second pumping signals have opposite phases with each other; and
   a second reset controlling means for controlling activation of the first and second pumping clock signals and the first and second pumping switch signals according to the enable signal.

10. The negative voltage generating circuit as recited in claim 9, wherein the reset controlling means includes:
    a down-level shifter for shifting a level of the enable signal of a power supply voltage and the ground voltage to a level of the power supply voltage and the negative voltage;
    an up-level shifter for shifting a level of the enable signal of the power supply voltage and the ground voltage to a level of an upper voltage and the ground voltage, wherein a level of the upper voltage is higher than the level of the power supply voltage;
    first and second MOS transistors for outputting the ground voltage inputted from their first terminals to gate of the first and second PMOS transistors connected to second terminals of the first and second MOS transistors, respectively;
    an inverter for inverting and outputting the shifted enable signal by the down-level shifter;
    a third MOS transistor for transmitting an input voltage inputted through its first terminal to its second terminal in response to a signal outputted from the inverter, wherein the input voltage is smaller than the power supply voltage but larger than a value subtracted an absolute value of the negative value from the power supply voltage;
    a capacitor for receiving a signal outputted from the up-level shifter through its first terminal; and
    fourth and fifth MOS transistors for outputting the negative voltage inputted from their first terminals to the first and second nodes connected to their second terminals, respectively, wherein the fourth and fifth MOS transistors are connected to a second terminal of the capacitor and a second terminal of the third MOS transistor together.

11. The negative voltage generating circuit as recited in claim 10, wherein the sensing means includes:
    a sixth MOS transistor for receiving the ground voltage through its gate, wherein a first terminal of the sixth MOS transistor is connected to the power supply voltage;

a seventh MOS transistor for receiving the negative voltage through its gate, wherein a first terminal of the seventh MOS transistor is connected to the power supply voltage; and a first buffer for providing the enable signal through its output terminal, wherein an input terminal of the first buffer is connected to a common second terminal of the sixth and seventh MOS transistor.

12. The negative voltage generating circuit as recited in claim 11, wherein the oscillating means includes:

a first NAND gate for receiving the enable signal through its first terminal;

a first inverter for inverting and transmitting a signal outputted from the first NAND gate, wherein the first inverter is provided with even numbers of inverters and a first input receives the output signal from the NAND gate and a last output is provided to a second terminal of the NAND gate; and a second buffer for buffering an output of an inverter of odd number of the first inverter and outputting it as the clock signal.

13. The negative voltage generating circuit as recited in claim 12, wherein the phase controlling means includes:

a first delaying means for delaying the clock signal outputted from the oscillating means for a first predetermined interval;

a second delaying means for delaying the clock signal outputted from the first delaying means for a second predetermined interval;

an OR gate for performing a logic operation on the clock signal and a clock signal delayed by the second delaying means;

a NAND gate for performing a logic operation on the clock signal and the clock signal delayed by the second delaying means;

a second inverter for inverting a signal outputted from the first delaying means; and a third buffer for buffering the signal outputted form the first delaying means.

14. The negative voltage generating circuit as recited in claim 13, wherein the second reset controlling means includes:

a first AND gate for receiving a signal outputted from the OR gate of the phase controlling means and the enable signal outputted from the sensing means and outputting the first pumping clock signal;

a second AND gate for receiving a signal outputted from the second NAND gate of the phase controlling means and the enable signal outputted form the sensing means and outputting the second pumping clock signal;

a third NAND gate for receiving a signal outputted from the second inverter of the phase controlling means and the enable signal outputted from the sensing means and outputting the first pumping switch signal; and a fourth NAND gate for receiving a signal outputted from the third buffer of the phase controlling means and the enable signal outputted from the sensing means and outputting the second pumping switch signal.

15. The negative voltage generating circuit as recited in claim 14, wherein the first and second pumping controlling means includes a first and second capacitor, respectively, wherein the first and second capacitor receives the first and second pumping clock signal through their first terminal and their second terminals are connected to the first and second nodes, respectively.

16. The negative voltage generating circuit as recited in claim 15, wherein the first pumping switch controlling means includes:

a third capacitor for receiving the first pumping switch signal through its first terminal, wherein a second terminal of the third capacitor is connected to the gate of the first switching means; and a first clamping circuit for making a node of the second terminal of the third capacitor stay in a predetermined voltage range.

17. The negative voltage generating circuit as recited in claim 15, wherein the first clamping circuit includes:

a first clamping PMOS transistor connected between the gate of the first switching means and the ground voltage, wherein a gate of the first clamping PMOS transistor is connected to the ground voltage;

a second clamping PMOS transistor whose first terminal is connected to the ground voltage, wherein a gate and a second terminal of the second clamping PMOS transistor are connected together; and a third clamping PMOS transistor whose first terminal is connected to the second terminal of the second clamping PMOS transistor, wherein a gate and a second terminal of the third clamping PMOS transistor are connected to the gate of the first switching means.

18. The negative voltage generating circuit as recited in claim 17, wherein the second pumping switch controlling means includes:

a fourth capacitor for receiving the second pumping switch signal through its first terminal, wherein a second terminal of the fourth capacitor is connected to the gate of the second switching means; and a second clamping circuit for making a node of the second terminal of the fourth capacitor stay in a predetermined voltage range.

19. The negative voltage generating circuit as recited in claim 18, wherein the second clamping circuit includes:

a fourth clamping PMOS transistor connected between the gate of the second switching means and the ground voltage, wherein a gate of the fourth clamping PMOS transistor is connected to the ground voltage;

a fifth clamping PMOS transistor whose first terminal is connected to the ground voltage, wherein a gate and a second terminal of the fifth clamping PMOS transistor are connected each other; and a sixth clamping PMOS transistor whose first terminal is connected to the second terminal of the fifth clamping PMOS transistor, wherein a gate and a second terminal of the sixth clamping PMOS transistor are connected to the gate of the second switching means.

20. The negative voltage generating circuit as recited in claim 19, wherein the electric charge transmitting means includes first and second NMOS transistors whose gates are cross-coupled to each other, wherein first terminals of the first and second NMOS transistors are connected to the output terminal together, and second terminals of the first and second NMOS terminals are connected to the first and second nodes, respectively.

* * * * *